July 16, 1935. E. MROSS 2,008,184
FOOD MIXER
Filed May 23, 1932 2 Sheets-Sheet 1
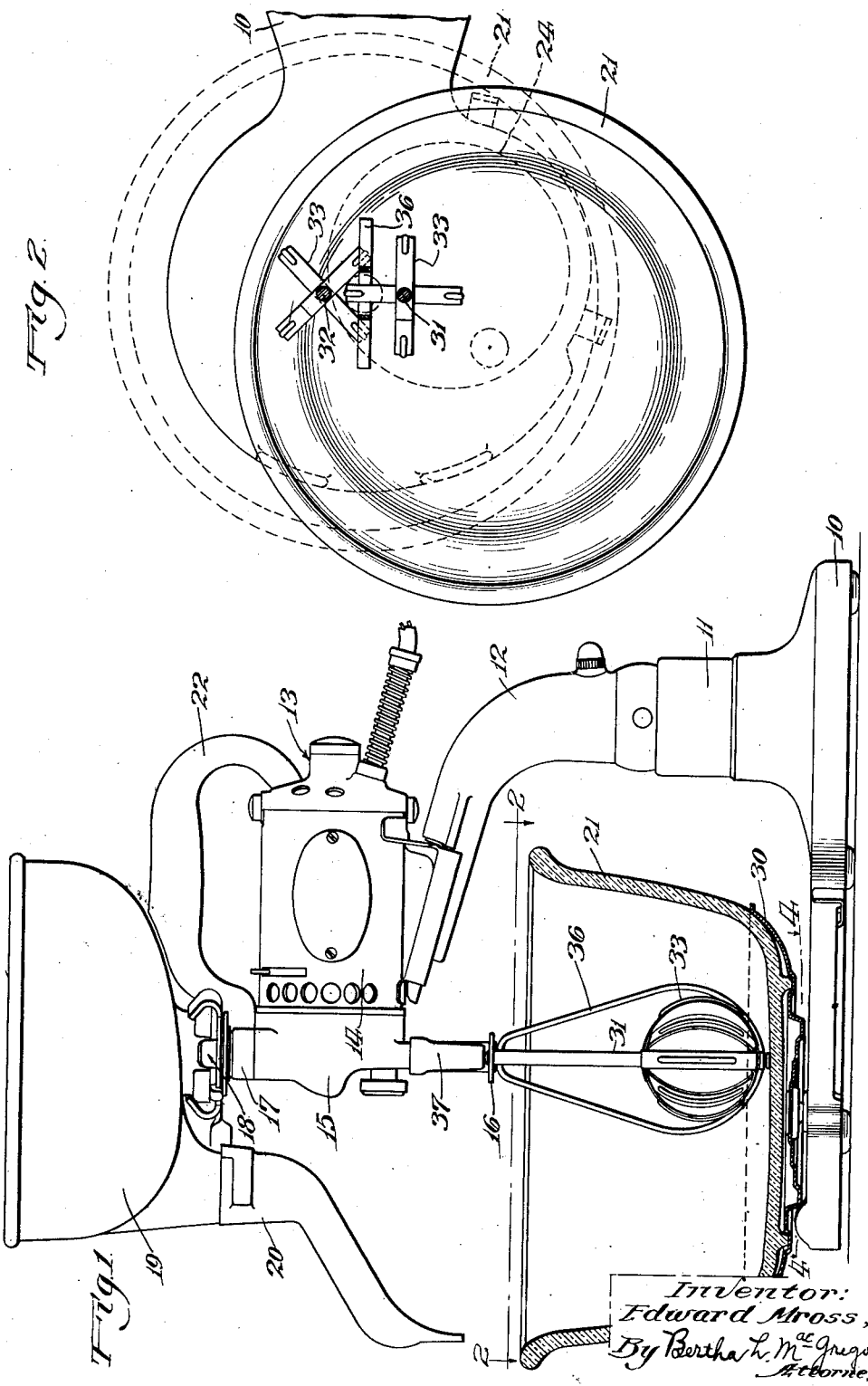

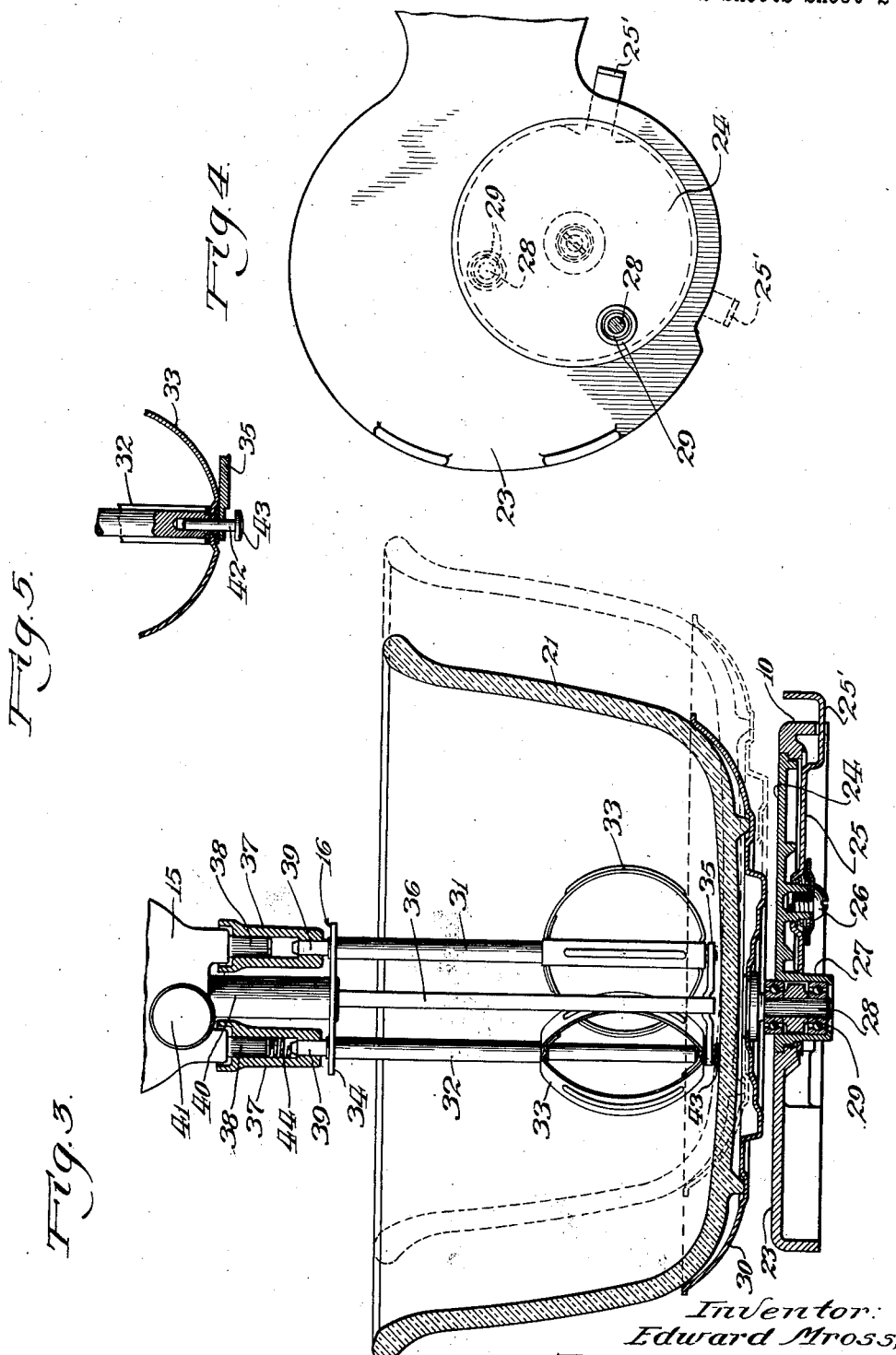

Patented July 16, 1935

2,008,184

UNITED STATES PATENT OFFICE 2,008,184

FOOD MIXER

Edward Mross, Racine, Wis., assignor to Hamilton Beach Manufacturing Company, Racine, Wis., a corporation of Wisconsin Application May 23, 1932, Serial No. 612,881

8 Claims. (Cl. 259—84)

This invention relates to food mixers, and more particularly to a food mixer having a support including revoluble means for carrying a mixing bowl, and having means associated with the agitator for automatically causing the bowl to revolve.

The object of the invention is to provide a simple and efficient mechanical device for automatically revolving the bowl, whether the bowl is empty or contains ingredients to be mixed; and, preferably, to provide such bowl revolving means in combination with means for shifting the position of the bowl laterally with respect to the agitator. The advantage of having the bowl revolved automatically is obvious, for, except when the agitator is in the exact center of the bowl, the bowl must be revolved in order to act upon all the material lying in the annular path in which the agitators may be operating. The advantage of having the bowl automatically revolved about its own axis and also movable laterally of the agitator, is that a variety of revolving speeds are obtainable, depending on the extent to which the axis of the agitator is spaced from the axis of the bowl.

The advantages of providing, in a food mixer, means for gradually shifting the bowl relatively to the agitators of the mixer are fully set forth in my co-pending application, Serial No. 612,884, filed herewith. The present invention is especially directed to the means for automatically revolving the bowl, which may be used to advantage in mixers which have the bowl revolubly mounted in a predetermined position as well as in mixers embodying the said bowl shifting mechanism of my co-pending application.

In the drawings:—

Fig. 1 is a side elevation of a food mixer and support embodying my invention, with a mixing bowl and dished plate for carrying the bowl, shown in section.

Fig. 2 is a horizontal sectional view taken on the line 2—2 of Fig. 1.

Fig. 3 is a front elevation of the mixer gear casing and agitator unit, the latter being partly in section, and also showing the base and bowl in section.

Fig. 4 is a horizontal section taken on the line 4—4 of Fig. 1.

Fig. 5 is an enlarged elevation of a detail of the construction, partly in section.

As illustrative of the device in which is embodied the invention sought to be protected by this application, I have shown in Fig. 1 a combination food mixer and juice extractor, in which the horizontally disposed base is indicated at 10, an upright socket, integral with the base, at 11, a pivotally mounted arm at 12, and a motor driven food mixer, detachably mounted on the arm, at 13. The food mixer comprises a motor 14, carrying a gear casing 15, and a detachable agitator or beater unit 16. The motor is operatively connected with the agitators beneath the gear casing and with the juice extractor above the gear casing. The gear casing 15 is provided with a socket 17 which receives the coupling which operatively and removably connects the reamer drive shaft to a driven shaft in the gear casing. The reamer drive shaft and coupling carry the supporting and clamping device 18 for the bowl 19. The bowl is provided with a spout 20. The food mixer bowl is indicated at 21, and a handle on the motor, at 22.

It will be understood that the invention herein shown, described and claimed may be embodied in food mixers of various constructions, and is not limited to the particular combination in which it is illustrated herein, in Fig. 1.

Novel features of construction of the combination food mixer and juice extractor, not claimed herein, are the subject of applications co-pending herewith.

In the circular top portion 23 of the base 10 is a shifter plate 24 connected to a disc 25 carrying an actuating lever 25'. The plates 24 and 25 are mounted in a circular opening in the top 23 of the base, and are revoluble about the axis of the screw 26 which holds the plates 24 and 25 together.

An open top bearing receptacle 27 extends downwardly from the shifter plate 24 and is located eccentrically, near the peripheral margin of the plate. The bearing receptacle is adapted to receive the hub 28 and ball bearing unit 29 depending centrally from a dished plate 30 which carries the bowl 21. The construction of the shifter plate parts is described in greater detail in the co-pending application herein referred to. As will be readily understood, the actuation of the lever 25' revolves the plate 24 about its own axis, and carries the bearing receptacle 27 holding the bearing unit 28, 29 of the bowl-carrying plate 30, from the full line position of Figs. 2 and 4 to the position indicated by the dotted lines, or to an intermediate position. By this device the bowl 21 may be moved, gradually, laterally of the agitator unit 16, so that said unit will be located near the center of the bowl, or near the side wall of the bowl, or radially intermediate said extreme positions.

The means for automatically revolving the bowl 21 will now be described. Referring to Fig. 3, the agitator unit 16 which is detachably secured to the gear casing 15, consists of two beater shafts 31, 32, carrying beater rings 33. At their upper ends the beater shafts 31, 32 extend loosely and rotatably through a plate 34, that part of the shafts 31, 32 above the plate 34 being square in cross section. At their lower ends the shafts 31, 32 are rotatably mounted in a flat cross piece 35. A frame consisting of a flat wire loop 36 (Fig. 1) is connected at its bottom to the cross piece 35, and at its top to the plate 34, thus holding the beaters together as a unit.

A pair of couplings 37 are carried by the ends of the driven shafts 38 which depend from the gear casing 15. The square ends 39 of the shafts 31 and 32 fit into and rotate with the couplings 37. The center support 40 and hand screw 41 hold the unit in operative position on the gear casing 15.

One of the beater shafts, in this embodiment the shaft 32, is equipped with means for automatically revolving the bowl when the shaft is being rotated. The shaft 32 has fixedly mounted in its lower end a pin 42 provided with a small disc or head 43, slightly convex on its lower surface. The pin 42 extends through the cross piece 35, is rotatable and vertically movable relatively to the cross piece 35. Preferably a coiled spring 44 is interposed between the shaft 38 and end 39 of the shaft 32 in the coupling 37. The expansive tendency of the spring as well as the weight of the beater shaft 32 tend to force the shaft 32 downwardly and consequently the pin 42 and head 43 will project below the cross piece 35, and the head 43 will bear on the bottom of the bowl 21. It will, of course, be understood that the mixer as a whole will be so supported, in relation to the bowl, that the bottom of the agitator unit will be in proper position, relatively close to the surface of the bowl bottom.

If the bottom of the bowl had a perfectly flat upper surface, the bearing of the head 43 would be uniform on the bowl surface, and the greatest speed of revolution of the bowl would be attained when the head 43 was located near but not at the exact center of the bowl bottom. However, most bowls have slightly concave surfaces and, therefore, the head 43 bears more heavily on the surface adjacent the side walls than near the center, thus increasing the revolving efficiency of the bowl when the agitator carrying the head 43 is located in an annular path removed from the center of the bowl.

The automatic bowl revolving means preferably will be mounted on that beater shaft which is nearest the circumferential side wall of the bowl when the bowl and agitator unit are not axially aligned. For example, in Fig. 3 the bowl 21 is movable from the centered, solid line position, toward the right, to the off-center, dotted line position. Therefore, the left hand beater shaft 32 carries the revolving device 42, 43. However, the automatic bowl revolving means may be applied to either of the agitators. Since the beater shafts rotate in opposite directions, only one should be equipped as described. The rotation of the disc 43 while bearing on the bowl bottom, causes the bowl to revolve about the axis of the hub 28, and this movement brings into contact with the agitator all the material lying in the annular path in which the agitator is working. By shifting the plate 24, while the bowl is being automatically revolved, materials in other annular paths of the bowl are brought into contact with the beaters, and quick, efficient mixing is accomplished.

Changes may be made in details of construction without departing from the scope of my invention and I do not intend to be limited to the exact form shown and described, except as set forth in the appended claims.

I claim:—

1. A food mixer comprising a motor, an agitator operatively connected with the motor, a support on which the mixer is carried, a mixing bowl, means on the support for revolubly carrying the bowl means for gradually shifting the position of the bowl laterally of the agitator while the agitator is in the bowl and the bowl is located on its revoluble support, and means on the agitator for revolving the bowl about its own axis when the agitator is being rotated by the motor.

2. A food mixer comprising a motor, an agitator operatively connected with the motor, a support on which the mixer is carried, a mixing bowl, means on the support for revolubly carrying the bowl means for gradually shifting the position of the bowl laterally of the agitator while the agitator is in the bowl and the bowl is located on its revoluble support, and means on the agitator for revolving the bowl about its own axis when the agitator is being rotated by the motor, said means comprising a disc carried on the lower end of the agitator and bearing on the upper surface of the bottom of the bowl.

3. A food mixer comprising a motor, an agitator operatively connected with the motor, a support on which the mixer is carried, a mixing bowl, means on the support for revolubly carrying the bowl, and means on the agitator for revolving the bowl about its own axis when the agitator is being rotated by the motor, the agitator comprising a pair of rotatable beater shafts, their lower ends being rotatably mounted in a cross piece, and the means for automatically revolving the bowl comprising a pin depending from one of the beater shafts, extending through the cross piece, and a disc on the end of the pin, said disc bearing on the upper surface of the bowl bottom.

4. A food mixer comprising a base, an arm extending upwardly from the base, a power unit supported by the arm in overhanging position relatively to the base, an agitator depending from the power unit, a bowl, a bowl-carrying plate rotatably mounted on the base, means for moving the bowl-carrying plate and bowl off center relatively to the agitator while the bowl is located on said plate and the agitator is in the bowl, and a rotated member on the lower end of the agitator for bearing on the upper surface of the bowl bottom laterally of the axis of the bowl.

5. A food mixer comprising a base, an arm extending upwardly from the base, a power unit supported by the arm in overhanging position relatively to the base, an agitator depending from the power unit, a bowl, a bowl-carrying plate rotatably mounted on the base, means for moving the bowl-carrying plate and bowl off center relatively to the agitator while the bowl is located on said plate and the agitator is in the bowl, the agitator having two vertical shafts carrying beater elements, and means on one of the agitator shafts for establishing bearing pressure of one of said shafts on the bowl bottom, laterally of the axis of the bowl, while the other agitator shaft is in non-bearing relation relatively to the bowl.

6. A food mixer comprising a rotatable agitator having two beater shafts, means for rotating the same in opposite directions, a bowl freely revolubly mounted in juxtaposition to the agitator, a bowl-bearing member mounted on the lower end of one of the beater shafts and projecting below the end of the other beater shaft, and means on the said first mentioned beater shaft for producing frictional, yielding engagement between the bowl-bearing member and the bowl and thereby automatically revolving the bowl when the agitator is operated.

7. A food mixer comprising a motor, an agitator operatively connected with the motor, a support on which the mixer is carried, a mixing bowl, means on the support for revolubly carrying the bowl, means for gradually shifting the relative position of the bowl and agitator in a lateral direction while the agitator is in the bowl and the bowl is located on its revoluble support, and means on the agitator for revolving the bowl about its own axis when the agitator is being rotated by the motor, said means comprising a disc carried on the lower end of the agitator and bearing on the upper surface of the bottom of the bowl.

8. A food mixer comprising a motor, an agitator operatively connected with the motor, a support on which the mixer is carried, a mixing bowl, means on the support for revolubly carrying the bowl, means for gradually shifting the relative position of the bowl and agitator in a lateral direction while the agitator is in the bowl and the bowl is located on its revoluble support, and means on the agitator for revolving the bowl about its own axis when the agitator is being rotated by the motor.

EDWARD MROSS.